Patented Nov. 18, 1947

2,431,028

UNITED STATES PATENT OFFICE 2,431,028

STABILIZED CYCLIZED RUBBER COMPOSITIONS AND SHEET WRAPPING MATERIAL COATED THEREWITH

Clarence M. Carson, Cuyahoga Falls, Ohio, assignor to Wingfoot Corporation, Akron, Ohio, a corporation of Delaware No Drawing. Original application July 28, 1943, Serial No. 496,434. Divided and this application October 23, 1944, Serial No. 560,036

5 Claims. (Cl. 260—800)

This invention relates to improvements in those rubber derivatives which are known generally as cyclized rubbers and their uses. More particularly, the invention relates to cyclized rubbers and cyclized rubber compositions which are stabilized with a phenol-amine-aldehyde product. This application is a division of my application Serial No. 496,434, filed July 28, 1943, which has issued as Patent No. 2,413,432, December 31, 1946.

The invention includes coatings which contain cyclized rubbers stabilized as herein described. The addition of the stabilizers or so-called oxidation inhibitors gives several advantages with respect to moistureproofness, heat-sealability, etc. The invention includes the stabilized compositions, coatings made therewith, coated products, etc.

Cyclized rubbers may be prepared by treating rubber with various condensing or cyclizing agents. For example, the halide of an amphoteric metal or chlorostannic acid or a combination of two or more reagents may be caused to react with rubber under controlled conditions. Boron fluoride may be used as the condensing agent. The derivatives may be formed in the manner disclosed by Sebrell in United States Patent No. 2,052,423 and by Endres in United States Patent No. 2,052,391. This consists essentially in reacting a solution of rubber in benzol with a condensing (or cyclizing) agent—for example, chlorostannic acid or tin tetrachloride—and then decomposing the metallic addition product thus formed and removing the metallic impurities.

A product of this type is now marketed as "Pliolite" resin by The Goodyear Tire & Rubber Company. The rubber derivative may be used in the dry, powdered form in which it is recovered by distillation of the solvent from the emulsion produced as described in the Endres and Sebrell patents by adding to water the reacted solution of rubber and condensing agent. The dried product obtained by the above process may vary in physical properties, depending upon the temperature at which emulsification takes place, the chemical structure of the condensing agents, and the pH value of the water. The product usually obtained by the use of tin tetrachloride-hydrochloric acid is a whitish powder, of varying degrees of particle size, but containing a small percentage of material insoluble in coal-tar solvents, such as toluol, or in petroleum solvents, such as "rubber-solvent" gasoline. Such solutions are grayish in color and cloudy in appearance, due to suspended insoluble material.

By the process of milling—i. e., by passing this powder repeatedly or continuously through steel rollers—the powder is massed into a sheet which may be ground, when cooled, into particles the size of a small bean, dark brown to yellow in color. This product is easily soluble in cold toluol or gasoline, giving a much clearer solution than the unmilled. Whereas the unmilled powder in toluol forms a solution too viscous to be applied to a sheet material, such as paper, by a dipping or roller application, the milled material is of much lower viscosity and readily lends itself to such applications.

It is possible to extend the useful applications of tin tetrachloride-hydrochloric acid resin by varying the time of reaction or the amount of the reagents. By this means a range of products having a distortion point of from 5° to 105° C. have been prepared and marketed for various uses.

By the use of other amphoteric halides, such as boron fluoride or phosphorous oxychloride, similar products are obtained. The boron fluoride product has the advantage of being more easily freed of metallic impurities and is more easily soluble in toluol and gasoline, with a lower viscosity than the tin tetrachloride product. Hence, it may be used in the unmilled state. The phosphorous oxychloride condensation product is intermediate in solution viscosity, clarity, and color between the boron fluoride and the tin tetrachloride product.

Reference has been made to "distortion point." This is determined as follows: The dried reaction product in its unmilled or powdered state is molded by heat and pressure into a sheet 10 inches square and ⅛ inch thick. From this sheet 1-inch wide strips are cut. These are placed on two fulcrums, 1 inch high and 8 inches apart, which are immersed in a water bath. The temperature of the water bath is raised 1° C. per minute. At each minute the strip of molded sheet is pushed down at the midpoint between the fulcrums until it touches the bath. The pressure is immediately released. When the strip softens to the point where it does not return to its original straight position, the temperature is noted, and this is called the distortion point.

For purposes of brevity, Pliolite in its unmilled or powdered form will be called in this disclosure "Pliolite resin powder" and in the milled condition, "Pliolite resin." The oxidized products referred to herein, apparently, contain about 3 per cent of oxygen. Pliolite resin is further designated by various numbers, as follows:

| Number | Description | Distortion Point |
|---|---|---|
| | | °C. |
| P1233 | Oxidized product | 5–35 |
| P744 | Unoxidized product | 45 |
| Resin #2 | do | 50–60 |
| 29,900 | do | 50–60 |
| P1230 | Oxidized product | 50–60 |
| Resin #40 | Unoxidized product | 75 |
| Resin #20 | do | 95–100 |

In the above list, there are three stages of manufacture grouped at 50–60° C. distortion point. Resin #2 is the unmilled, unoxidized powder; #29,900 is the milled product obtained from Resin #2; P 1230 is the oxidized and remilled form of #29,900.

In the above table some of the products are described as oxidized, and others are described as unoxidized. Although the latter may contain some oxygen, the term "unoxidized" is used to apply to a cyclized product, such as that obtained by reacting a rubber cement with chlorostannic acid under conditions which tend to exclude oxygen from the reacting ingredients. As the rubber cement for carrying out such a reaction on a commercial scale is prepared from milled rubber, there is, no doubt, some oxygen in the product. When the reaction is thus carried out in the absence of oxygen, the product obtained by steam distilling the emulsion obtained by pouring the reacted cement into water is a white, granular product. This product is substantially entirely soluble in mineral spirits. When this granular product is milled on a rubber mill and the resulting sheet is ground and the ground particles are dissolved or dispersed in mineral spirits, a relatively clear solution or dispersion is obtained. Such a soluble product is referred to in the above table as "unoxidized."

The oxidized products may be produced in any one of several ways. For example, the reacted cement may be oxidized by passing oxygen through it. Chemicals such as hydrogen peroxide, ammonium persulphate, etc., may be used to accelerate the oxidation. According to a preferred method, the dried and milled rubber derivative, either in sheet form or as particles, preferably varying in size from that retained by a 10-mesh-per-inch screen and that which completely passes a 2-mesh-per-inch screen, may be heated in air or in oxygen gas under carefully controlled conditions.

For example, in the preparation of Pliolite P 1233, the substantially unoxidized product with a distortion point of from about 5 to 35° C. is first milled. The resulting milled sheet is ground to a particle size of the order above indicated. The ground product is placed in trays 1 inch deep and heated for 18 to 48 hours by circulating air at 175° F. over it. The length of time required for oxidation depends upon the softening point of the P 1233 resin. The product is considered oxidized when it has increased in weight about 3 per cent.

The granular oxidized product resulting from oxidation in a tray as above described is not entirely soluble in mineral spirits. It is more nearly soluble in benzene and toluol, etc. Milling disperses the oxidized portion throughout the whole mass of resin, thereby improving its dispersion in solvents.

The time required for oxidation of the solid material may vary from 12 to 96 hours or longer, and the temperature of the air used for oxidation may vary from, for example, about 125° F. to 175° F. In actual practice, the softest rubber derivative has been found to oxidize more quickly and at a lower temperature than the harder derivatives. For instance, Pliolite with a distortion point of 15° C. can be oxidized in 12 hours at 150° F., whereas the derivative having a distortion point of 55° C. may require 36 hours at 175° F.

The oxidized product may be dispersed in various solvents, such as toluol, gasoline, hydrogenated gasoline, benzol, carbon tetrachloride, and various mixtures of the above or similar solvents. The solution viscosity is relatively high. By milling the product and thereby dispersing the outer oxidized shell of each particle, a more easily soluble, low viscosity product is obtained. Various advantages of the oxidized product will be evident from the following disclosure. For instance, the oxidation of a cyclized rubber of low distortion point improves its adherence to Cellophane, cellulose acetate, metals, lithographed papers, etc.

The compositions of this invention may be compounded in solution or as melts of the various cyclized rubber derivatives in paraffin or other waxes, etc. For this purpose the resin should be in the unoxidized and preferably in the unmilled or powdered form. Use of the milled resin forms a darker colored wax mixture, and oxidation decreases the solubility and miscibility with paraffin. While the tin tetrachloride-hydrochloric acid derivative is soluble in paraffin only to a very limited extent, it is easily dispersed and forms a stable mechanical mixture. The boron fluoride mixture is much more soluble while products obtained by long reaction with a large amount of reagent (resulting in distortion points of 100–150° C.) are soluble in an equal weight of paraffin. They form brittle, wax-like products.

The mechanical mixtures of Pliolite and paraffin are marketed in proportions varying from 5 per cent to 50 per cent Pliolite and are called "Pliowax." Higher concentrations can be prepared if necessary. Pliolite resin powder may be mixed with all mineral waxes, such as ceresin, Ozokerite, etc., but is not compatible with such vegetable waxes as carnauba and candelilla. However, if the powder is first melted with paraffin, a proportion of vegetable wax may then be added.

Pliowaxes are prepared as follows: Twenty-five pounds of paraffin are melted at 20 pounds' steam pressure in a steam-jacketed mixer having two Z-type blades rotating toward each other in a horizontal plane. Such mixers are used in the rubber, asphalt, paint, and bakery industries and are marketed by the J. H. Day Company and the Baker Perkins Company. Twenty-five pounds of Pliolite resin powder #2, which preferably has been sifted through a 40-mesh screen, is added to the molten wax. Mixing is continued until a smooth product is obtained. If the melt is to be further diluted with paraffin, it is added at this point.

Endres U. S. Patent No. 2,052,391 describes Pliolite formulae used in paints and lacquers. The present invention relates in particular to Pliolite compositions suitable for use as moisture-vapor proofing coatings for paper, including glassine paper, metal foil, regenerated cellulose sheet, cellulose acetate sheet, casein sheet, printed or lithographed labels, and to increase the moisture-vapor resistance of such materials as rubber hydrochloride sheet and nitrocellulose coated foil, paper or other sheet material. It further relates to the formulation and use of adhesives containing Pliolite.

Pliolite, like most other materials, requires certain modifying agents, depending upon the qualities desired in the final product. Most of the materials in the following list are compatible with Pliolite up to 10 per cent by weight. Modifying agents, such as paraffin or ester gum, are compatible in amounts as high as 20 to 25 per cent. With materials such as carnauba wax or ethyl cellulose, less than 10 per cent is the maximum compatibility.

Mention has been made of the process of oxidizing the Pliolite resin and then remilling the oxidized product in order to disperse the oxidized portion, thus obtaining lower solution viscosity, clearer solution, and better adhesion. This oxidized product coated on paper may lose its ability to heat-seal at low temperatures, or may take on other undesirable characteristics. However, the introduction of oxidation inhibitors will prevent further change in the product. The best oxidation inhibitors are not those commonly used in the rubber industry, but rather those which have been found to be the best for prevention of gum formation in gasoline. However, the secondary aromatic amines and the water-insoluble derivatives of hydroquinone also have been found to prevent rapid aging of Pliolite resins. Some representative inhibitors are listed below under the heading "6." This list is by no means complete, but serves only as a means of designating certain groups.

The plasticizers or modifiers which have been employed in adhesive and moistureproofing compositions include:

1. Oils
    Linseed, palm, soybean, perilla, tung, castor, castor derivatives, mineral, oleic acid, Neville oil, bodied tung oil, heat-treated tung oil, vegetable-oil acids, and animal-oil acids.
2. Waxes
    Paraffin, ceresin, candelilla, beeswax, carnauba, Japan, spermaceti, Halowax 1014, octyl alcohol, cetyl alcohol, opal wax, solid-wax alcohols, hydrogenated fatty acids, toluol-soluble soaps (glyceryl monostearate), plastic or amorphous waxes.
3. Gums and resins
    Ester, cumar, dammar, copal, purified dammar residue.
4. Synthetics
    Vinylite, Neville resin, Aroclor, AWII, RH-35, Petrex 59-71, Petrex-all, Beckacite, Beckasol, Berex, Sucrose Octa-Acetate, Vistanex-all, Amberol ST-137, ethyl cellulose, benzyl cellulose, triphenyl phosphate, Santicizers, vinyl acetal, glyptals, chlorinated rubber.
5. Liquid plasticizers
    Tricresyl phosphate, dibutyl phthalate, amyl stearate, Hercolyn, Abalyn, glyceryl butyl phthalate, glyceryl abietate, diamyl naphthalene, monoamyl naphthalene, ethyl lactate, butyl stearate, ethylene glycol, tributyl citrate, dibutyl sebacate, Cardolite, lauryl alcohol.
6. Oxidation inhibitors
    a. Aromatic and heterocyclic bases
        o-Amino diphenyl, p-amino diphenyl, diamino diphenyl methane, p-phenylene diamine, p-amino dimethyl aniline, o-toluidine, benzamide, n-n' di (o-methyl cyclohexyl)-piperazine.
    b. Secondary aromatic amines
        Diphenyl-p-phenylenediamine, phenyl-o-tolyl-phenylenediamine, p-hydroxy diphenyl amine.
    c. Phenols and naphthols and ethers, etc.
        Butyl hydroquinone, pyrocatechol, alpha-naphthol, hydroquinone-monobenzyl ether ("Agerite Alba"), veratrole, diamyl hydroquinone, formaldehyde-phenol-amine condensation products.
    d. Aminophenols
        o-Aminophenol, p-aminophenol, p-benzyl-aminophenol, 2-amino-5-hydroxy-toluene.
    e. Plasticizers having oxidation inhibiting value
        Glyceryl mono stearate, 2-7-hydroxy-naphthalene, amino stearine.

The compositions of this invention are stabilized with the aldehyde- or formaldehyde-phenol-amine condensation products mentioned above. The following example illustrates the use of the stabilizer or antioxidant in a formula designed particularly for label coating. The coated label is highly moistureproof and is heat-sealable.

*Example*

|  | Parts |
|---|---|
| Pliolite 29,900 | 60.8 |
| Cumar resin | 18.4 |
| Paraffin (134° F.) | 9.2 |
| Liquid petrolatum | 9.2 |
| Antioxidant | 2.4 |

Rubber-solvent gasoline or other suitable vehicle, such as toluene, carbon tetrachloride, mixed aromatics, etc., is employed. The antioxidant is the condensation product of a phenol, formaldehyde, and an amine which may, for example, be prepared as follows:

Twenty-two grams (0.2 mol) of resorcinol and 52 grams (0.6 mol) of morpholine were charged into a suitable apparatus and stirred until nearly all of the resorcinol had gone into solution. Then with constant stirring, 51 grams (0.6 mol) of 35 per cent formaldehyde was run in slowly at a temperature below 35° C. After the formaldehyde had all been added, the reaction mixture was heated until all crystalline material had disappeared (temperature 90-95° C.). To this was then added 75 grams of benzene, and the mixture was refluxed. Water was trapped out from the reflux return until the benzene solution was dry. After cooling, the product crystallized partially from the benzene solution. The amount of crystalline material may be reduced or resinified by heating.

The phenol and amine used in the above condensation may be varied and may be used in different proportions as indicated by the following table:

| Phenol | Amine | Formaldehyde | Molecular Ratio |
|---|---|---|---|
| Phenol | Morpholine | Formaldehyde | 1:3:3 |
| Do | Cyclohexylamine | do | 1:3:3 |
| Do | Diethylamine | do | 1:3:3 |
| Do | Morpholine | do | 1:2:2 |
| Resorcinol | do | do | 1:3:3 |

Each of the condensation products thus produced is a satisfactory antioxidant with either oxidized or unoxidized Pliolite.

What I claim is:

1. A stabilized cyclized rubber composition which contains as a stabilizer a condensation product of a phenol, formaldehyde, and morpholine of the class in which the phenol, formaldehyde, and morpholine are used in the ratios 1:3:3 and 1:2:2.

2. Moistureproof sheet wrapping material consisting of glassine paper coated with a cyclized rubber stabilized with a phenol-formaldehyde-morpholine condensation product of the class in which the phenol, formaldehyde, and morpholine are reacted in the ratios 1:3:3 and 1:2:2.

3. Moistureproof sheet wrapping material consisting of metal foil coated with a cyclized rubber stabilized with a phenol-formaldehyde-morpholine condensation product of the class in which the phenol, formaldehyde, and morpholine are reacted in the ratios 1:3:3 and 1:2:2.

4. Moistureproof sheet wrapping material consisting of regenerated cellulose coated with a cyclized rubber stabilized with a phenol-formaldehyde-morpholine condensation product of the class consisting of the products obtained by reacting a phenol, formaldehyde, and morpholine in the ratios 1:3:3 and 1:2:2.

5. Moistureproof sheet wrapping material which comprises a coating of a cyclized rubber stabilized with a phenol-formaldehyde-morpholine condensation product of the class in which the phenol, formaldehyde, and morpholine are reacted in the ratios of 1:3:3 and 1:2:2.

CLARENCE M. CARSON.

REFERENCES CITED

The following references are of record in the file of this patent:

UNITED STATES PATENTS

| Number | Name | Date |
|---|---|---|
| 2,300,368 | Harmon | Oct. 27, 1942 |
| 2,350,366 | Mitchell | June 6, 1944 |
| 2,350,385 | Charch | June 6, 1944 |